(12) United States Patent
Fujii

(10) Patent No.: US 8,090,039 B2
(45) Date of Patent: Jan. 3, 2012

(54) WIRELESS TRANSCEIVER AND WIRELESS TRANSMITTING/RECEIVING METHOD AND PROGRAM THEREOF

(75) Inventor: Masaaki Fujii, Kanagawa (JP)

(73) Assignee: Samsung Electronics Co., Ltd., Suown-si (KR)

( * ) Notice: Subject to any disclaimer, the term of this patent is extended or adjusted under 35 U.S.C. 154(b) by 758 days.

(21) Appl. No.: 10/544,349

(22) PCT Filed: Feb. 18, 2004

(86) PCT No.: PCT/KR2004/000332
§ 371 (c)(1),
(2), (4) Date: May 18, 2006

(87) PCT Pub. No.: WO2004/075436
PCT Pub. Date: Sep. 2, 2004

(65) Prior Publication Data
US 2006/0251149 A1 Nov. 9, 2006

(30) Foreign Application Priority Data

Feb. 18, 2003 (JP) .................................. 2003-040309

(51) Int. Cl.
*H04B 7/02* (2006.01)
*H04B 7/212* (2006.01)
*H04B 7/216* (2006.01)
*H04B 1/00* (2006.01)
*H04L 27/00* (2006.01)
*H04J 3/00* (2006.01)
*H04J 4/00* (2006.01)
*H04J 1/00* (2006.01)

(52) U.S. Cl. ........ 375/267; 375/130; 375/140; 375/146; 375/147; 375/299; 370/330; 370/335; 370/337; 370/342; 370/343; 370/344; 370/345; 370/347; 370/478; 455/101

(58) Field of Classification Search .................. 375/143, 375/146, 148, 229, 267, 295; 370/204, 210, 370/320, 334, 335, 343, 431; 455/562.1
See application file for complete search history.

(56) References Cited

U.S. PATENT DOCUMENTS 6,069,884 A   5/2000   Hayashi et al.
(Continued)

FOREIGN PATENT DOCUMENTS

EP          1 137216        9/2001
(Continued)

OTHER PUBLICATIONS

Jeong, Incheol, et al., "Performance of OFDM-CDMA Systems with Transmit Diversity on Forward Link Transmission," Jan. 2001, Technical Report of IEICE, Japan vol. 100, No. 561, pp. 69-75.

(Continued)

*Primary Examiner* — Khanh C Tran
*Assistant Examiner* — Eboni Hughes
(74) *Attorney, Agent, or Firm* — NSIP Law

(57) ABSTRACT

The present invention is provided with a wireless transceiver and wireless transmitting/receiving method and program thereof capable of improving the robustness against Doppler frequency by containing transmit diversity signals in one spreading region. In the present invention, the transmitter encodes the transmit signals using a space-time matrix and transmits the encoded space-time signals after being spread with different spreading codes, and the receiver de-spreads the received spread signals, in unit of time slot, with the spreading codes corresponding to the respective time slots and then decodes the de-spread signals using the space-time matrix.

10 Claims, 12 Drawing Sheets

U.S. PATENT DOCUMENTS

| | | |
|---|---|---|
| 6,868,112 B2 | 3/2005 | Kim et al. |
| 7,031,371 B1 * | 4/2006 | Lakkis .......................... 375/146 |
| 2002/0118770 A1 * | 8/2002 | Foschini et al. ............... 375/267 |
| 2003/0016640 A1 * | 1/2003 | Onggosanusi et al. ....... 370/335 |
| 2003/0174782 A1 * | 9/2003 | Papadias et al. .............. 375/295 |
| 2003/0198282 A1 * | 10/2003 | Tujkovic et al. .............. 375/146 |
| 2004/0002364 A1 * | 1/2004 | Trikkonen et al. ......... 455/562.1 |
| 2004/0022183 A1 * | 2/2004 | Li et al. ......................... 370/210 |
| 2004/0047402 A1 * | 3/2004 | Hui et al. ...................... 375/148 |

FOREIGN PATENT DOCUMENTS

| | | |
|---|---|---|
| EP | 1 170 897 | 1/2002 |
| JP | 2003-23381 | 1/2003 |
| KR | 10-2000-0013615 | 3/2000 |
| KR | 10-2002-0042918 | 6/2002 |

OTHER PUBLICATIONS

Kenichi Miyoshi, "A Study on Time Domain Spreading for OFCDM," Nov. 2001, Technical Report of IEICE, Japan, vol. 101, No. 437, pp. 13-18.

Korean Office Action issued on Apr. 1, 2011, in corresponding Korean Patent Application No. 10-2005-7013786 (5 pages).

* cited by examiner

WIRELESS TRANSCEIVER AND WIRELESS TRANSMITTING/RECEIVING METHOD AND PROGRAM THEREOF

PRIORITY

This application claims priority to an application entitled "A WIRELESS TRANSCEIVER AND WIRELESS TRANSMITTING/RECEIVING METHOD AND PROGRAM THEREOF" filed with the Korean Patent Office on Feb. 18, 2003 and assigned Serial No. 40309/2003, and an application entitled the same filed with the International Bureau on Feb. 18, 2004 and assigned Serial No. PCT/KR2004/000332, the contents of which are incorporated herein by reference.

TECHNICAL FIELD

The present invention relates to a wireless transceiver, a wireless transmitting/receiving method and a program thereof to which transmit/receive diversity using a space-time code is applied.

BACKGROUND ART

With the development of a recent mobile communication system, the communication system requires a wideband, high frequency and high reliability. Accordingly, transmit diversity technologies are effective in improving transmission quality without increasing a radio part of a terminal. Moreover, it is known that two-dimensional spreading capable of increasing a spreading gain is effective in an environment in which other-cell interference is serious.

Time-domain spreading is considered as orthogonal frequency-division multiplexing-code-division multiplexing (OFDM-CDM)-based spreading, because the orthogonality between frequency-domain spreading codes is lower than the orthogonality between time-domain spreading codes in a frame format in which amplitude variation in a time domain through Doppler frequency according to the movement of a terminal is less than amplitude variation in a frequency domain according to frequency selectivity of a transfer path. Where a large spreading factor is required, two-dimensional spreading based on both the time and frequency domains is used. When a de-spreading operation is carried out, amplitude and phase in each subcarrier are compensated using a channel response in each subcarrier.

The time domain spreading is disclosed in "Properties of OFDM-CDMA Systems Using Transmit Diversity in Reception Link", Incheol JEONG and Masao NAKAGAWA, IEICE Technical Report, RCS 2000-184, January 2000, and "A Study on Time-Domain Spreading in FCDM", Kenichi MIYOSHI, Atushi MATSUMOTO and Mitsuru UESUGI, IEICE Technical Report, RCS 2001-179, November 2001.

The configurations of a wireless receiver and transmitter to which space-time transmit diversity is applied according to the OFDM-CDM based on the time-domain spreading are shown in FIGS. 10 and 11.

When transmission signals Ω are inputted, a wireless transmitting side carries out an encoding operation based on the following Equation 1.

$$\Omega = \begin{bmatrix} S_1 & S_2 \\ -S_2^* & S_1^* \end{bmatrix} \quad \text{Equation 1}$$

Two code streams $[S_1, -S_2^*]$ and $[S_2, S_1^*]$ as outputs of space-time encoding operations are outputted to antenna branches #1 and #2, respectively. The antenna branch #1 receives the code stream $[S_1, -S_2^*]$ and carries out a time-domain spreading operation for $S_1$ and $-S_2^*$ using one self-user signal spreading code as shown in FIG. 12. At this point, $S_1$ is assigned to a $1^{st}$ time slot, and $-S_2^*$ is assigned to a $2^{nd}$ time slot later than the $1^{st}$ time slot. That is, space-time code signals of two different time slots are spread by the same self-user signal spreading code. Furthermore, the antenna branch #2 receives the code stream $[S_2, S_1^*]$ and carries out a time-domain spreading operation for $S_2$ and $S_1^*$ using the self-user signal spreading code as in the antenna branch #1.

At this point, $S_2$ is assigned to the $1^{st}$ time slot and $S_1^*$ is assigned to the $2^{nd}$ time slot later than the $1^{st}$ time slot. That is, space-time code signals of two different time slots are spread by the same self-user signal spreading code.

Then, each of the antenna branches #1 and #2 multiplexes other user signals obtained similarly to the user signal spread by the self-user signal spreading code according to the time-domain spreading.

Moreover, each of the antenna branches #1 and #2 multiplexes the multiplexed self-user and other-user signals and a pilot signal pre-stored in the wireless transmitter and receiver.

The multiplexed signals containing the user and pilot signals are converted into time domain signals based on inverse fast Fourier transform (IFFT) and guard intervals (GIs) are added to the time-domain signals.

Antennas of the antenna branches #1 and #2 simultaneously radiate output signals after the GIs are added.

Therefore, when the conventional wireless transmitter applies space-time transmit diversity to a frame format, space-time encoding outputs shown in FIG. 12 as described above are assigned to two consecutive spreading regions (=two different time slots).

On the other hand, the antennas of the antenna branches #1 and #2 in the wireless receiver receive the signals radiated from the antennas of the antennas branches #1 and #2, and output the received signals to time-domain de-spreaders and channel estimators.

The channel estimators estimate channel responses from the signals received by the antennas using pre-stored pilot signals.

The time-domain de-spreaders subtract the pilot signals from the received signals and sequentially de-spread signals of two different time slots using the self-user signal spreading code.

Furthermore, a space-time decoder receives channel estimation values of channels h1 and h2, and obtains decoded signals by carrying out a space-time decoding operation for space-time code signals of two time slots consecutive in the time domain of the signals de-spread by the time-domain de-spreaders.

In an example described above, signals of the two different time slots are sequentially de-spread using the self-user signal spreading code so that a spreading encoding operation can be carried out using the same self-user signal spreading code between the space-time code signals of different time slots. For this reason, a channel response cannot be obtained symbol by symbol in the time de-spreading operation. Accordingly, the de-spreading operation in the wireless receiver corresponds to equivalent-gain combining de-spreading using only the self-user signal spreading code. There is a problem in that a spreading factor is limited so that the orthogonality between codes is maintained and the effect of time-domain variation is not present.

For example, when a 2×2 space-time code matrix is used where space-time transmit diversity is applied, two symbols outputted in the time domain are spread by two spreading regions in the time domain. Moreover, channel responses need to be invariable in time slot intervals of a plurality of symbols in relation to space-time codes.

Accordingly, a need exists for a design immune to the time-domain variation in two spreading regions. Furthermore, there is another problem in that design requirements are complex or transmission characteristics are degraded when two spreading regions are affected by the time variation.

DISCLOSURE OF THE INVENTION

Therefore, the present invention has been made in view of the above problems, and it is an object of the present invention to provide a wireless transceiver, a wireless transmitting/receiving method and a program thereof that can improve the robustness against Doppler frequency by containing transmit diversity signals in one spreading region.

In one general aspect, there is provided a wireless transmitter, comprising: spreading means for spreading space-time code signals of time slots at which space-time encoding outputs based on an encoding operation of encoding means are different, using different spreading codes; and transmitting means for transmitting the spread signals from the spreading means.

The spreading means spreads the space-time code signals of the time slots at which the space-time encoding outputs are different, in a time domain using the different spreading codes in the wireless transmitter.

The spreading means spreads the space-time code signals of the time slots at which the space-time encoding outputs are different, in time and frequency domains using the different spreading codes in the wireless transmitter.

Multiplexing means for multiplexing the spread signals in the same spreading segment is further comprised, and the transmitting means transmits the multiplexed signals from the multiplexing means in the wireless transmitter.

In another aspect, there is provided a wireless receiver, comprising: receiving means for receiving spread signals in which space-time code signals of time slots at which space-time encoding outputs based on an encoding operation using a space-time code matrix are different are spread using different spreading codes; de-spreading means for de-spreading the spread signals received by the receiving means at predetermined time slots using the spreading codes corresponding thereto; and decoding means for decoding the de-spread signals from the de-spreading means using the space-time code matrix.

In still another aspect, there is provided a wireless receiver, comprising: receiving means for receiving spread signals in which space-time code signals of time slots at which space-time encoding outputs based on an encoding operation using a space-time code matrix are different are spread in a time domain using different spreading codes; de-spreading means for de-spreading the spread signals received by the receiving means at predetermined time slots in the time domain using the spreading codes corresponding thereto; and decoding means for decoding the de-spread signals from the de-spreading means using the space-time code matrix.

In yet another aspect, there is provided a wireless receiver, comprising: receiving means for receiving spread signals in which space-time code signals of time slots at which space-time encoding outputs based on an encoding operation using a space-time code matrix are different are spread in time and frequency domains using different spreading codes; de-spreading means for de-spreading the spread signals received by the receiving means at predetermined time slots in the time domain using the spreading codes corresponding thereto; decoding means for decoding the de-spread signals from the de-spreading means using the space-time code matrix; and combining means for combining the decoded signals from the decoding means in the frequency domain.

In a further aspect, there is provided a transmitting method, comprising: encoding transmission signals using a space-time code matrix; spreading space-time code signals of time slots at which space-time encoding outputs based on the encoding are different, using different spreading codes; and transmitting the spread signals.

In another aspect, there is provided a receiving method, comprising: receiving spread signals in which space-time code signals of time slots at which space-time encoding outputs based on an encoding operation using a space-time code matrix are different are spread using different spreading codes; de-spreading the received spread signals at predetermined time slots using the spreading codes corresponding thereto; and decoding the de-spread signals using the space-time code matrix.

In still another aspect, there is provided a transmitting program for executing, on a computer, the processes comprising: encoding transmission signals using a space-time code matrix; spreading space-time code signals of time slots at which space-time encoding outputs based on the encoding are different, using different spreading codes; and transmitting the spread signals.

In yet another aspect, there is provided a receiving program for executing, on a computer, the processes comprising: receiving spread signals in which space-time code signals of time slots at which space-time encoding outputs based on an encoding operation using a space-time code matrix are different are spread using different spreading codes; de-spreading the received spread signals at predetermined time slots using the spreading codes corresponding thereto; and decoding the de-spread signals using the space-time code matrix.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
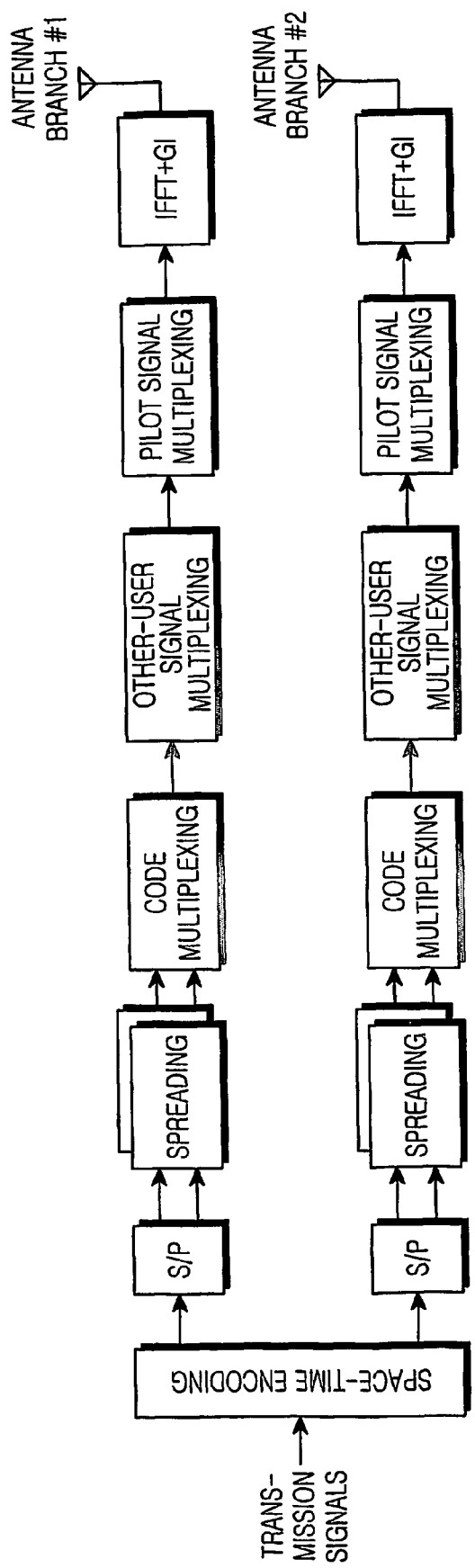
FIG. 1 is a block diagram illustrating a principle of a wireless transmitter in accordance with a preferred embodiment of the present invention.
Figure 2:
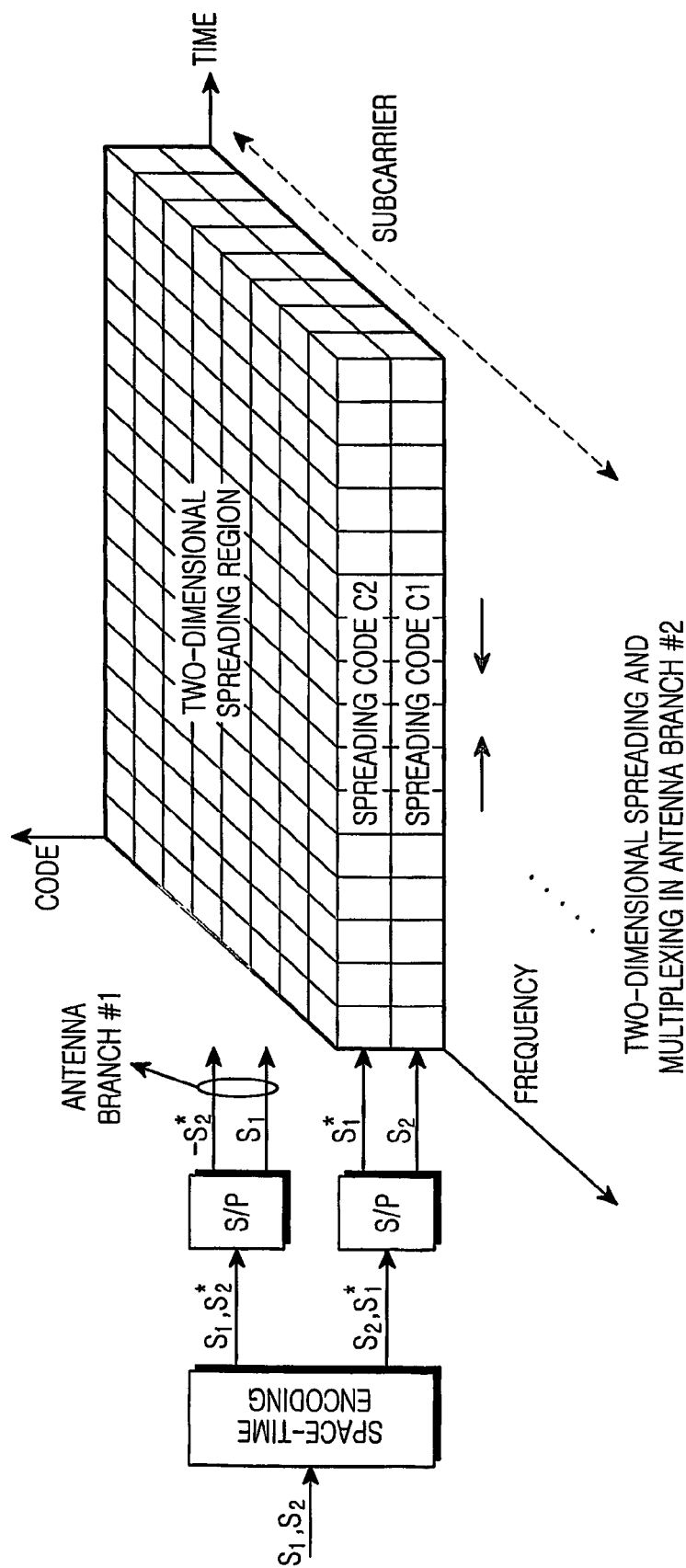
FIG. 2 is an explanatory view illustrating a principle for assigning space-time encoding outputs to a spreading region in the wireless transmitter in accordance with a preferred embodiment of the present invention.

First, a basic concept of the present invention will be described. FIGS. 1 to 6 are explanatory views illustrating a principle of the present invention. FIG. 1 shows one embodiment of a wireless transmitter to which the principle of the present invention is applied. As shown in FIG. 1, the wireless transmitter carries out a space-time encoding operation for transmission symbols (=transmission signals Ω) using a space-time code matrix. Here, the space-time code matrix with respect to the transmission signals $\Omega=[S_1,S_2]$ is shown in the above Equation 1. Two code streams $[S_1,-S_2^*]$ and $[S_2,S_1^*]$ as outputs of space-time encoding operations are outputted to antenna branches #1 and #2, respectively. As shown in FIG. 2, each antenna branch #1 carries out a serial-to-parallel (S/P) conversion operation for each code stream.

FIG. 2 explains an S/P conversion operation and a two-dimensional spreading operation in the antenna branch #2.

Space-time code signals $S_1$ and $-S_2^*$ are inputted to an S/P converter in the antenna branch #1 at $1^{st}$ and $2^{nd}$ time slots, respectively. The space-time code signal $S_1$ is spread by a spreading code C1, and the space-time code signal $-S_2^*$ is spread by a spreading code C2 where C1≠C2. A code multiplexing operation is carried out for a spreading output of the space-time code signal $S_1$ and a spreading output of the space-time code signal $-S_2^*$ in the same spreading segment.

Similarly, space-time code signals $S_2$ and $S_1^*$ are inputted into an S/P converter in the antenna branch #2 at the $1^{st}$ and $2^{nd}$ time slots, respectively. The space-time code signal $S_2$ is spread by the spreading code C1, and the space-time code signal $S_1^*$ is spread by the spreading code C2. A code multiplexing operation is carried out for a spreading output of the space-time code signal $S_2$ and a spreading output of the space-time code signal $S_1^*$ in the same spreading segment.

Figure 3:
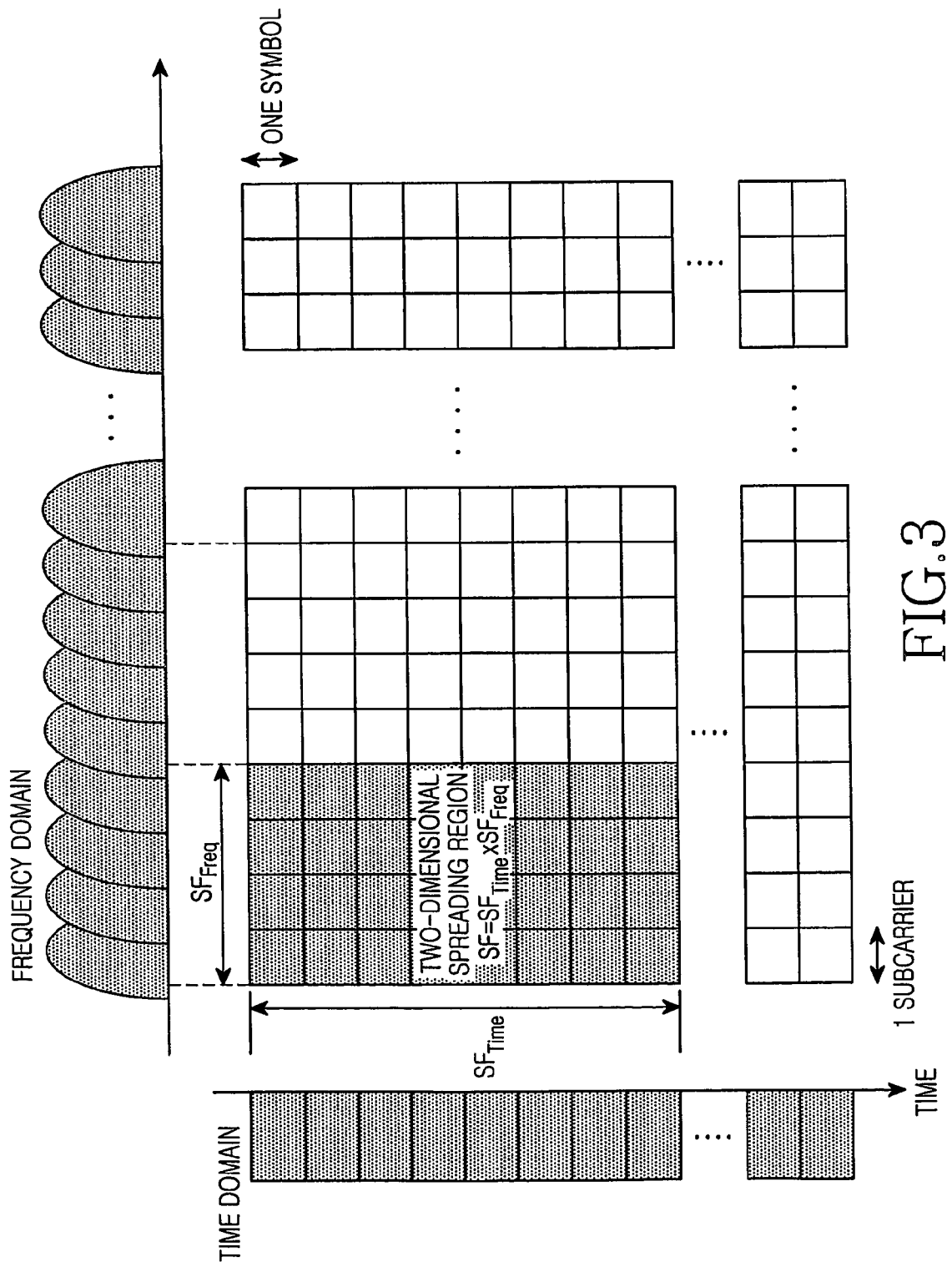
FIG. 3 is an explanatory view illustrating a principle of time-domain spreading in the wireless transmitter in accordance with a preferred embodiment of the present invention.

At this point, a spreading operation is carried out according to time-domain spreading or two-dimensional spreading in time and frequency domains as shown in FIG. 3. For example, where the time-domain spreading operation for the space-time code signal $S_1$ is carried out, the space-time code signal $S_1$ is spread by a plurality of symbols in one subcarrier. Alternatively, where the space-time spreading operation is carried out in the time and frequency domains, the space-time code signal $S_1$ is spread by a plurality of symbols in a plurality of subcarriers.

Two different code signals (=$S_1$ and $S_2$ or $-S_2^*$ and $S_1^*$) at the different time slots are spread by the different spreading codes (=C1 and C2), such that code-multiplexed self-user signals can be obtained. The self-user signals that are space-time coded, spread and multiplexed are multiplexed with other user signals.

Subsequently, pilot signals are spread by spreading codes #1 and #2 therefor orthogonal to the spreading codes C1 and C2 in each subcarrier within a time-domain spreading region or two-dimensional spreading region. The spread pilot signals and the multiplexed other-user and self-user signals are multiplexed.

Figure 4:
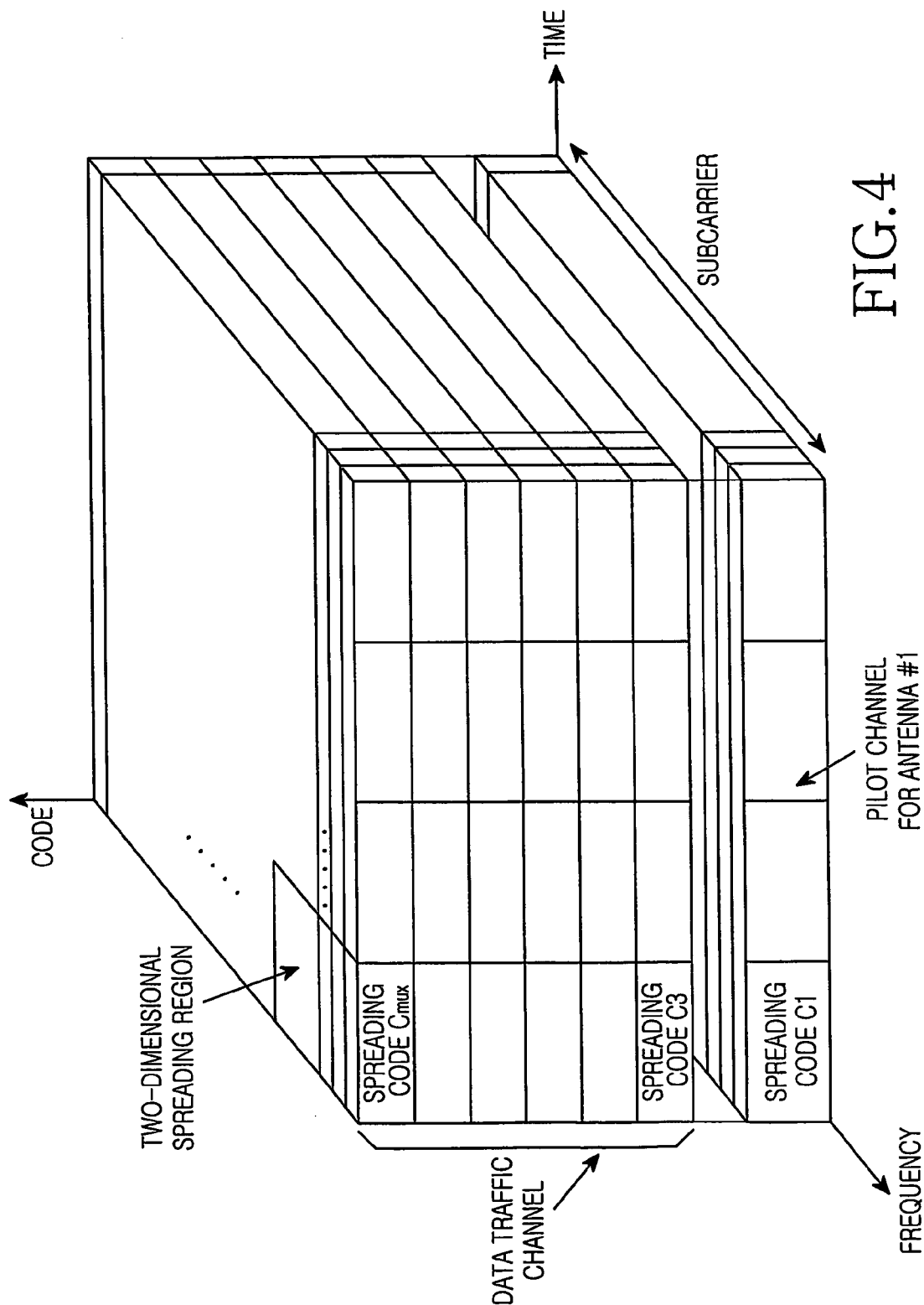
FIG. 4 is an explanatory view illustrating a principle of two-dimensional spreading in the wireless transmitter in accordance with a preferred embodiment of the present invention.

Frame signals (as shown in FIG. 4) generated by the above-described operations are converted into time-domain signals by inverse fast Fourier transform (IFFT).

Then, guard intervals (GIs) are added to the frame signals and then the frame signals to which the GIs are added are up-converted into carrier frequencies and are simultaneously transmitted to two antennas of the antenna branches #1 and #2.

That is, the wireless transmitter carries out the spreading operation using the spreading code C1 for the code signal $S_1$ and the spreading code C2 for the code signal $-S_2^*$, carries out the spreading operation using the spreading code C1 for the code signal $S_2$ and the spreading code C2 for the code signal $S_1^*$, and simultaneously transmits code-multiplexed signals.

Figure 5:
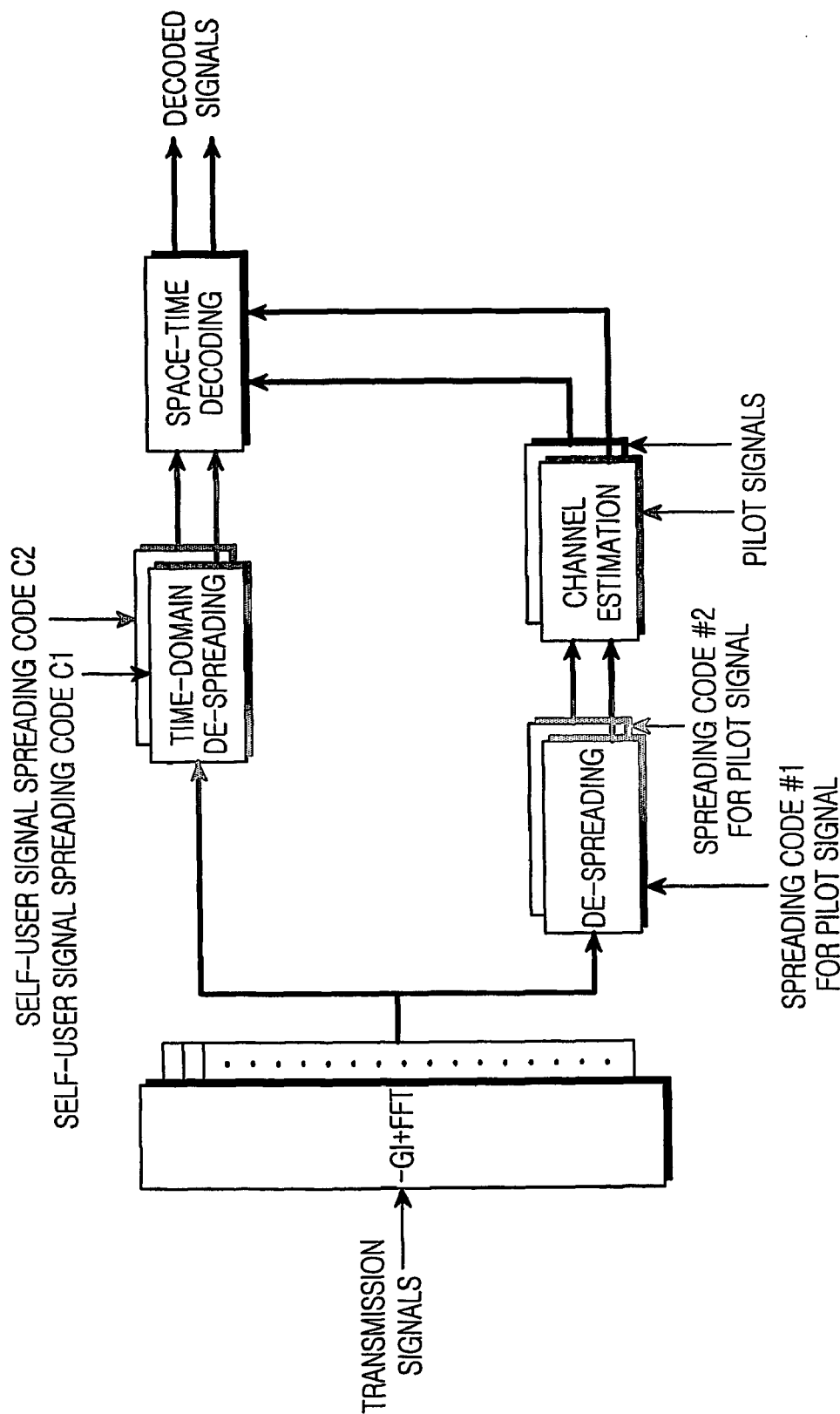
FIG. 5 is an explanatory view illustrating a frame signal in an antenna branch #1 of the wireless transmitter in accordance with a preferred embodiment of the present invention.
Figure 6:
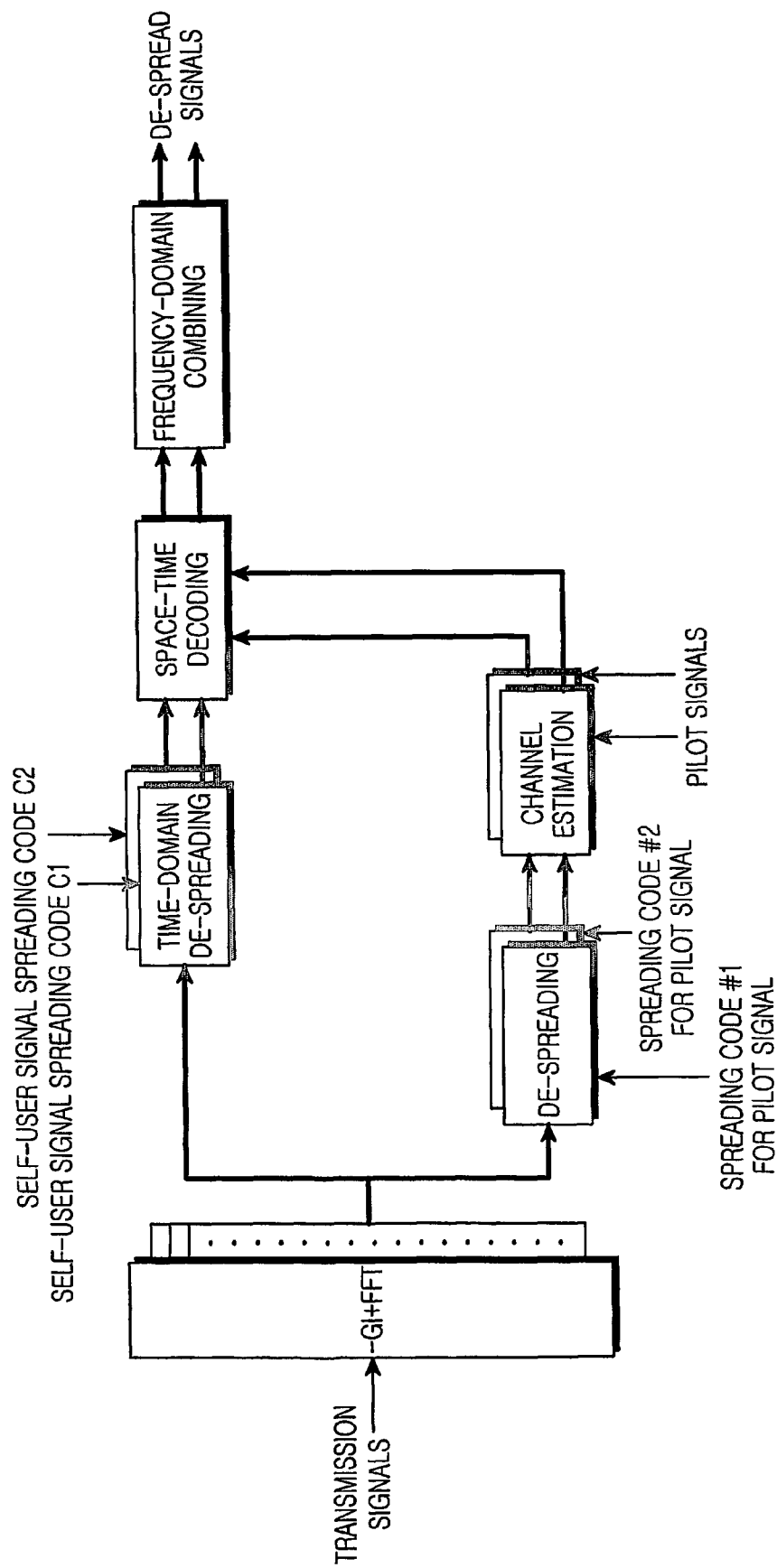
FIG. 6 is a block diagram illustrating a principle of a wireless receiver in accordance with a preferred embodiment of the present invention.

FIGS. 5 and 6 show one embodiment of the wireless receiver to which the principle of the present invention is applied.

As shown in FIG. 5, when simultaneously receiving the code-multiplexed signals by means of the antennas of the wireless receiver after the spreading operation is carried out using the spreading code C1 for the code signal $S_1$ and the spreading code C2 for the code signal $-S_2^*$, and the spreading operation is carried out using the spreading code C1 for the code signal $S_2$ and the spreading code C2 for the code signal $S_1^*$, the wireless receiver removes the GIs from the received signals. The signals based on a result of the removal are converted into subcarrier signals by fast Fourier transform (FFT).

Subsequently, a de-spreading operation is carried out for the subcarrier signals in respective subcarriers using the spreading codes #1 and #2 for pilot signals used in the antennas of the antenna branches #1 and #2.

Then, modulation components of the pilot signals are removed from de-spread signals, and channel responses are estimated in the antennas of the antenna branches #1 and #2 in the wireless transmitter. Furthermore, replicas of the pilot signals received from the respective transmit antennas are generated using the pilot signals, the spreading codes for the pilot signals and the channel estimation values.

On the other hand, the received pilot signal replicas are subtracted from the received subcarrier signals based on a Fourier transform operation. The received subcarrier signals from which the pilot signals are subtracted are de-spread in the time domain using the spreading codes C1 and C2.

A signal de-spread by the spreading code C1 is expressed as a sum of a product of the channel h1 and the code signal $S_1$ and a product of the channel h2 and the code signal $S_2$. Moreover, a signal de-spread by the spreading code C2 is expressed as a sum of a product of the channel h1 and the code signal $-S_2$ and a product of the channel h2 and the code signal $S_1$.

Furthermore, a space-time decoding operation is carried out for two de-spreading outputs at the time slots using the channel estimation values h1 and h2.

Where the transmission signals are spread in the time domain, the wireless receiver decodes the received signals (refer to FIG. 5).

On the other hand, where the transmission signals are spread by two-dimensional spreading in the time and frequency domains, the space-time code signals decoded in the respective subcarriers are combined in the frequency domain, such that the wireless receiver decodes the received signals (refer to FIG. 6).

In the conventional space-time transmit diversity, time-domain outputs of the space-time code matrix are spread in a plurality of spreading regions. However, in the space-time transmit diversity in accordance with the present invention, time-domain outputs of the space-time code matrix are spread in one spreading region using a plurality of spreading codes, such that the robustness against the time variation associated with a channel can be improved.

Furthermore, where the two-dimensional spreading is used, a partial de-spreading operation in the time domain in each subcarrier is carried out, a decoding operation is carried out, and a result of the decoding operation can be combined in the frequency domain.

One embodiment of the wireless transmitter and receiver in accordance with the present invention will be described with reference to the annexed drawings.

Figure 7:
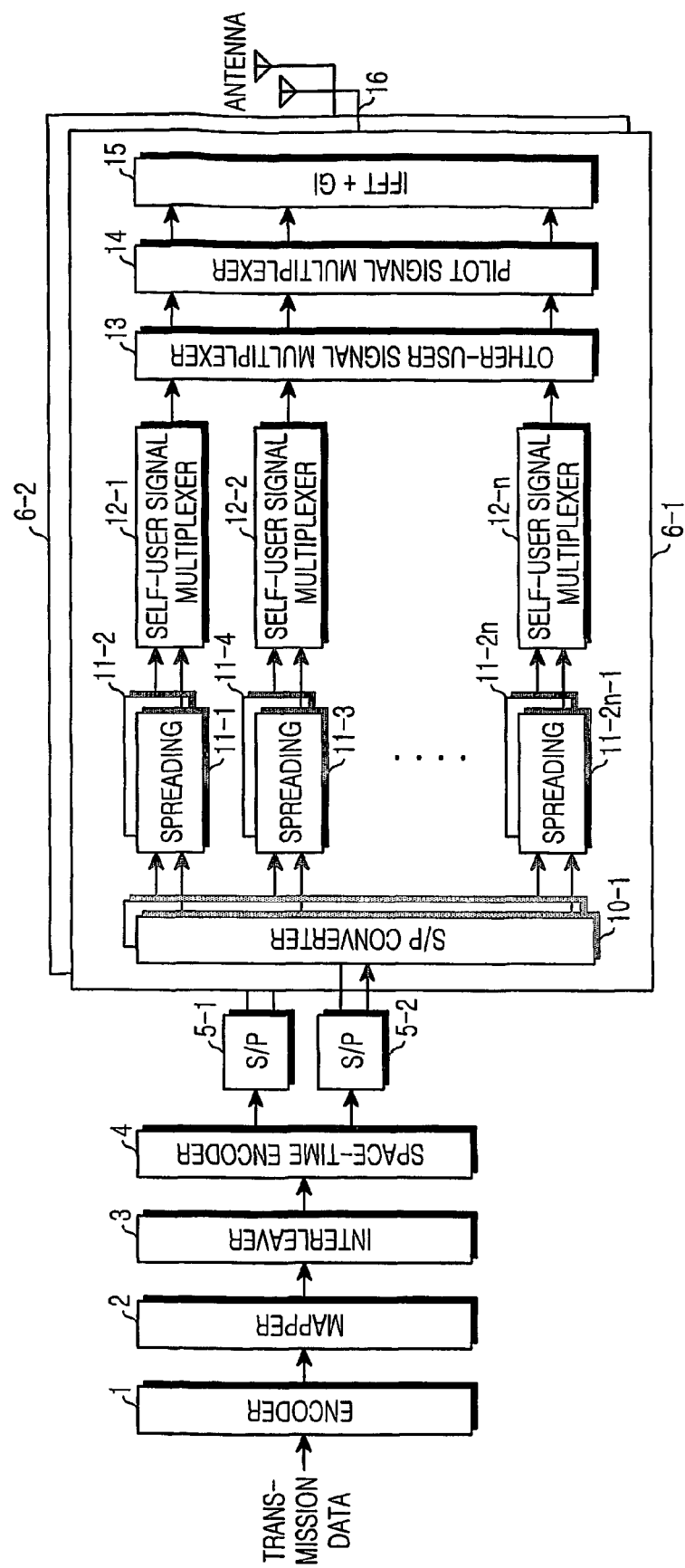
FIG. 7 is a block diagram illustrating a configuration of the wireless transmitter in accordance with a preferred embodiment of the present invention.

FIG. 7 is a block diagram illustrating a configuration of the wireless transmitter in multi-carrier code-division multiplexing (MC-CDM) or orthogonal frequency-division multiplexing-code-division multiplexing (OFDM-CDM) in accordance with the preferred embodiment of the present invention. The wireless transmitter in accordance with the preferred embodiment of the present invention includes an encoder 1, a mapper 2, an interleaver 3, a space-time encoder 4, serial-to-parallel (S/P) converters 5-1 and 5-2, and antenna branches 6-1 and 6-2.

The encoder 1 receives transmission data, carries out error correction encoding for the received transmission data, and outputs the encoded transmission data to the mapper 2.

The mapper 2 receives the encoded transmission data, maps the received encoded transmission data in a modulation constellation, and outputs the mapped data to the interleaver 3.

The interleaver 3 receives and interleaves (re-orders) the mapped data to spread a burst error, and outputs the interleaved data to the space-time encoder 4.

The space-time encoder 4 encodes an output signal of the interleaver 3 using the 2×2 orthogonal space-time code matrix shown in the above Equation 1.

The S/P converters 5-1 and 5-2 carry out S/P conversion operations for output signals of the space-time encoder 4, and output the converted signals to antenna branches 6-1 and 6-2.

The antenna branch 6-1 (=antenna branch #1 or #2) includes S/P converters 10-1 and 10-2, spreaders 11-1, 11-2, . . . , 11-2n (n is a natural number), self-user signal multiplexers 12-1, 12-2, . . . , 12-n, an other-user signal multiplexer 13, a pilot signal multiplexer 14, an inverse fast Fourier transform (IFFT) processor (=IFFT+GI) 15, and an antenna 16.

Furthermore, the antenna branch 6-2 is constituted similarly to the antenna branch 6-1.

The S/P converters 10-1 and 10-2 receive output signals of the S/P converter 5-1 and assign two spreaders to signals of each user. The user signals are outputted to one pair of assigned spreaders among the spreaders 11-1 and 11-2, 11-3 and 11-4, . . . , and 11-2n-1 and 11-2n.

The spreaders 11-1 and 11-2, 11-3 and 11-4, . . . , or 11-2n-1 and 11-2n spread two signals of the first column contained in the space-time code matrix using two spreading codes, and then the spread signals are multiplexed. That is, the spreaders 11-1 and 11-2, 11-3 and 11-4, . . . , or 11-2n-1 and 11-2n carry out the time-domain spreading operation or the two-dimensional spreading operation in the time and frequency domains shown in FIG. 3 using spreading codes for spreading signals of the same user, and output a result of the spreading operation to a corresponding self-user signal multiplexer 12-1, 12-2, . . . , or 12-n. For example, the spreaders 11-1 and 11-2 use spreading codes C1 and C2 for spreading the signals of each user. One pair of spreaders corresponding to the user signals in the antenna branch 6-2 uses the spreading codes C1 and C2 for spreading the signals of the same user as in one pair of spreaders in the antenna branch 6-1.

The self-user signal multiplexer 12-1, 12-2, . . . , or 12-n carries out a multiplexing operation in the same spreading segment by mixing self-user signals inputted from the spreaders 11-1 and 11-2, 11-3 and 11-4, . . . , or 11-2n-1 and 11-2n, and outputs a result of the multiplexing operation to the other-user signal multiplexer 13. For example, the self-user signal multiplexer 12-1 regards output signals of the spreaders 11-1 and 11-2 as self-user signals and regards other user signals as output signals of other spreaders. Similarly, this is applied to the self-user signal spreaders 12-2, 12-3, . . . , 12-n.

At this time, the spreaders 11-1 and 11-2 and 11-3 and 11-4 use spreading codes for different user signals. Similarly, all pairs of spreaders use spreading codes for different user signals.

The other-user signal multiplexer 13 receives and multiplexes a plurality of multiplexed self-user signals from the self-user signal multiplexers 12-2, 12-3, . . . , and 12-n using different spreading codes, and outputs a result of the multiplexing to the pilot signal multiplexer 14.

The pilot signal multiplexer 14 spreads pilot signals using spreading codes #1 and #2 therefor orthogonal to the spreading codes C1 and C2 for spreading the user signals in each subcarrier in a time-domain spreading region or two-dimensional spreading region, and multiplexes the user signals outputted from the other-user signal multiplexer 13 with the spread pilot signals.

Where the two-dimensional spreading is used, each subcarrier of a spreading segment selects spreading codes whose partial correlation value is 0. Where the partial correlation value is non-zero, a suppress operation is carried out through a frequency-domain combining operation to be described below.

An inverse fast Fourier transform (IFFT) processor 15 transforms a frame signal (FIG. 4), that is, the subcarrier signals multiplexed in the spreading segment, into a time-domain signal using IFFT. The IFFT processor 15 then adds a guard interval (GI) to the time-domain signal.

An antenna 16 receives an output signal of the IFFT processor 15 and up-converts the received output signal into a carrier frequency. The up-converted signal from the antenna 16 is simultaneously transmitted together with an up-converted signal from an antenna of the antenna branch 6-2.

Figure 8:
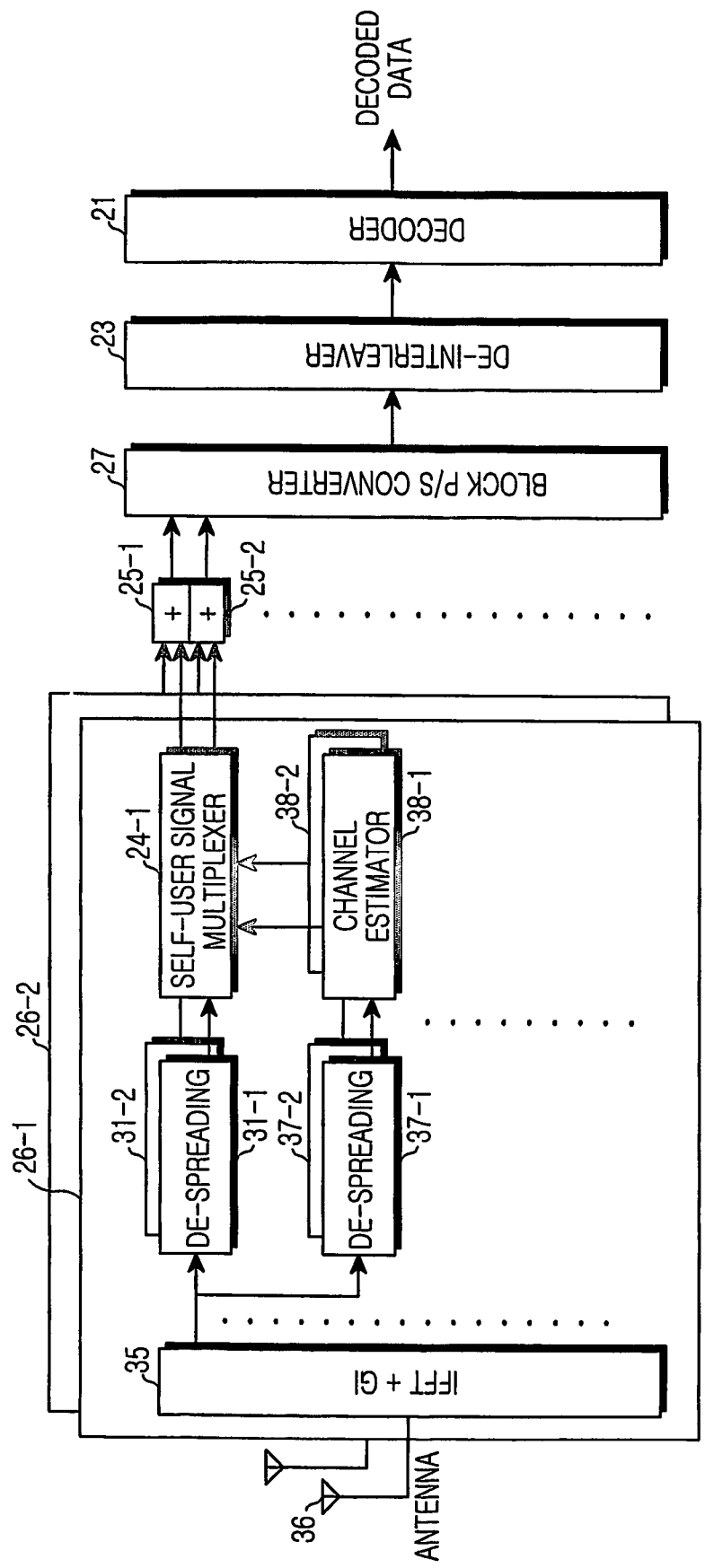
FIG. 8 is a block diagram illustrating a configuration of the wireless receiver in accordance with a preferred embodiment of the present invention.

FIG. 8 is a block diagram illustrating a configuration of the wireless receiver in multi-carrier code-division multiplexing (MC-CDM) or orthogonal frequency-division multiplexing-code-division multiplexing (OFDM-CDM) where the wireless transmitter carries out a time-domain spreading operation in accordance with the preferred embodiment of the present invention.

The wireless receiver shown in FIG. 8 in accordance with the preferred embodiment of the present invention includes antenna branches 26-1 and 26-2, adders 25-1, 25-2, . . . and 25-n, a block parallel-to-serial (P/S) converter 27, a de-interleaver 23 and a decoder 21.

Figure 9:
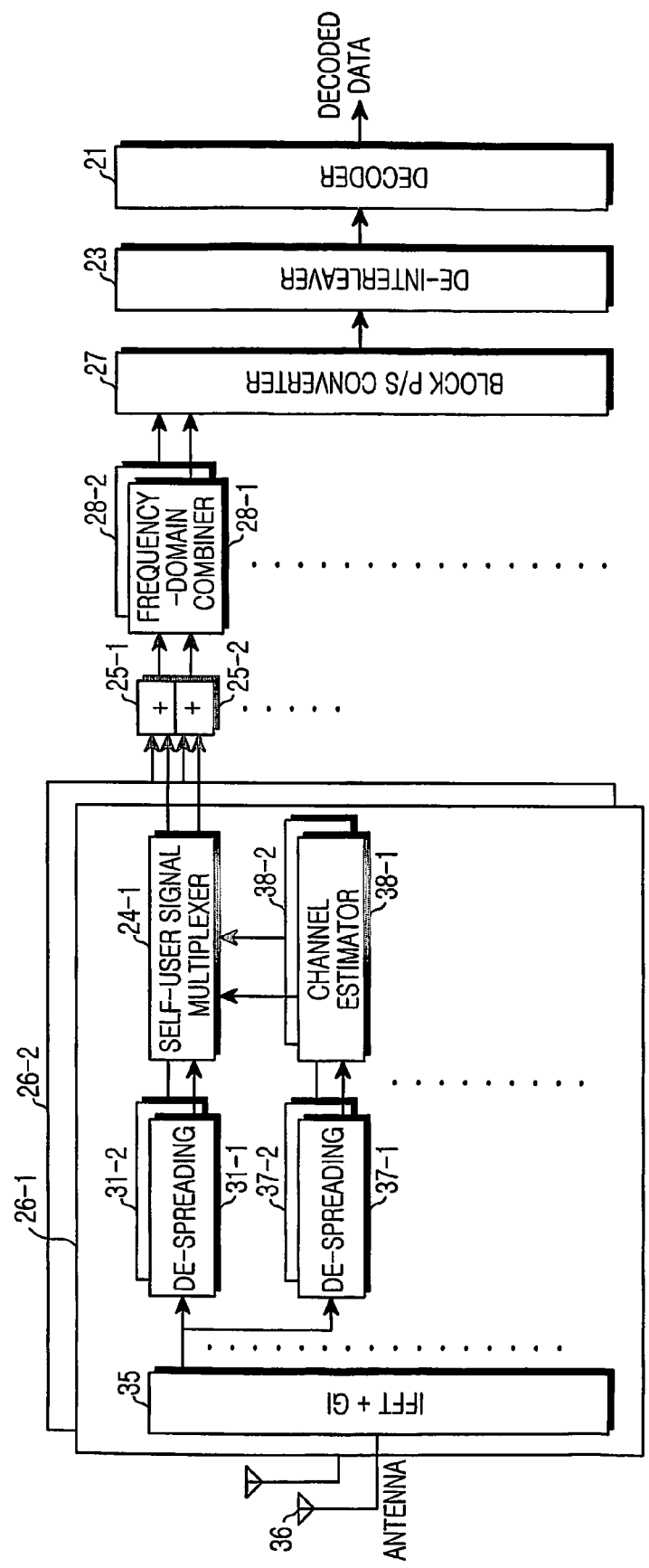
FIG. 9 is a block diagram illustrating a configuration of the wireless receiver in accordance with a preferred embodiment of the present invention.
Figure 10:
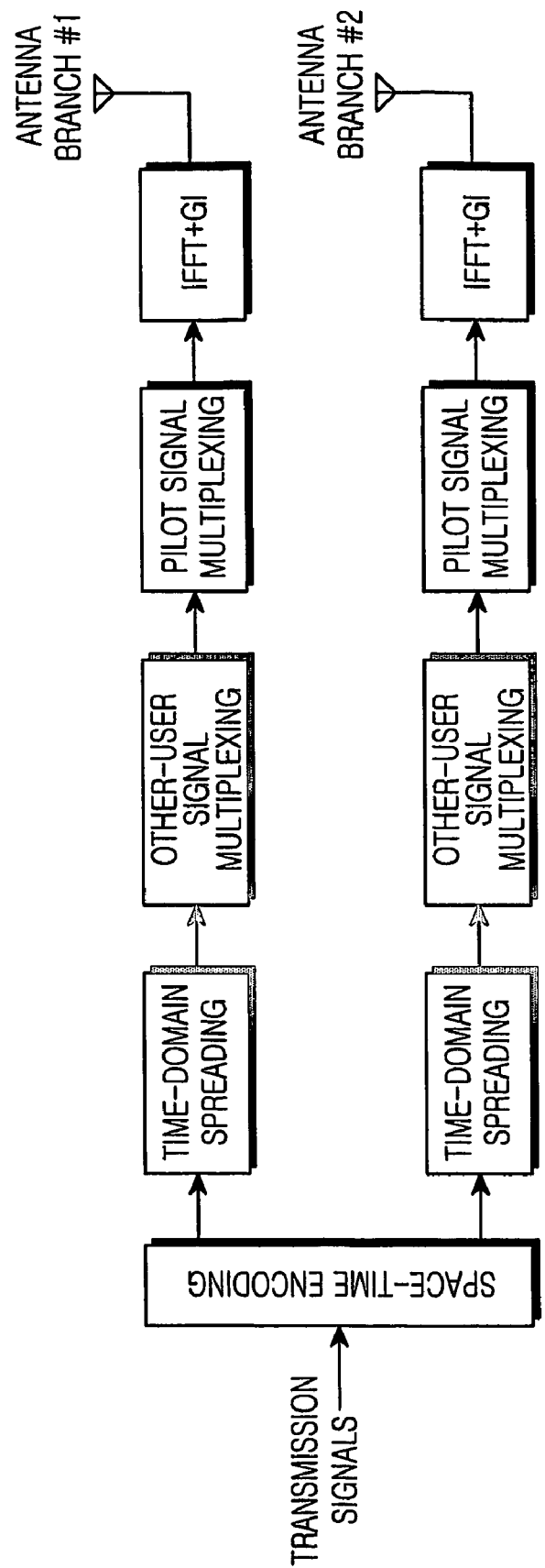
FIG. 10 is a block diagram illustrating the configuration of a conventional wireless transmitter.
Figure 11:
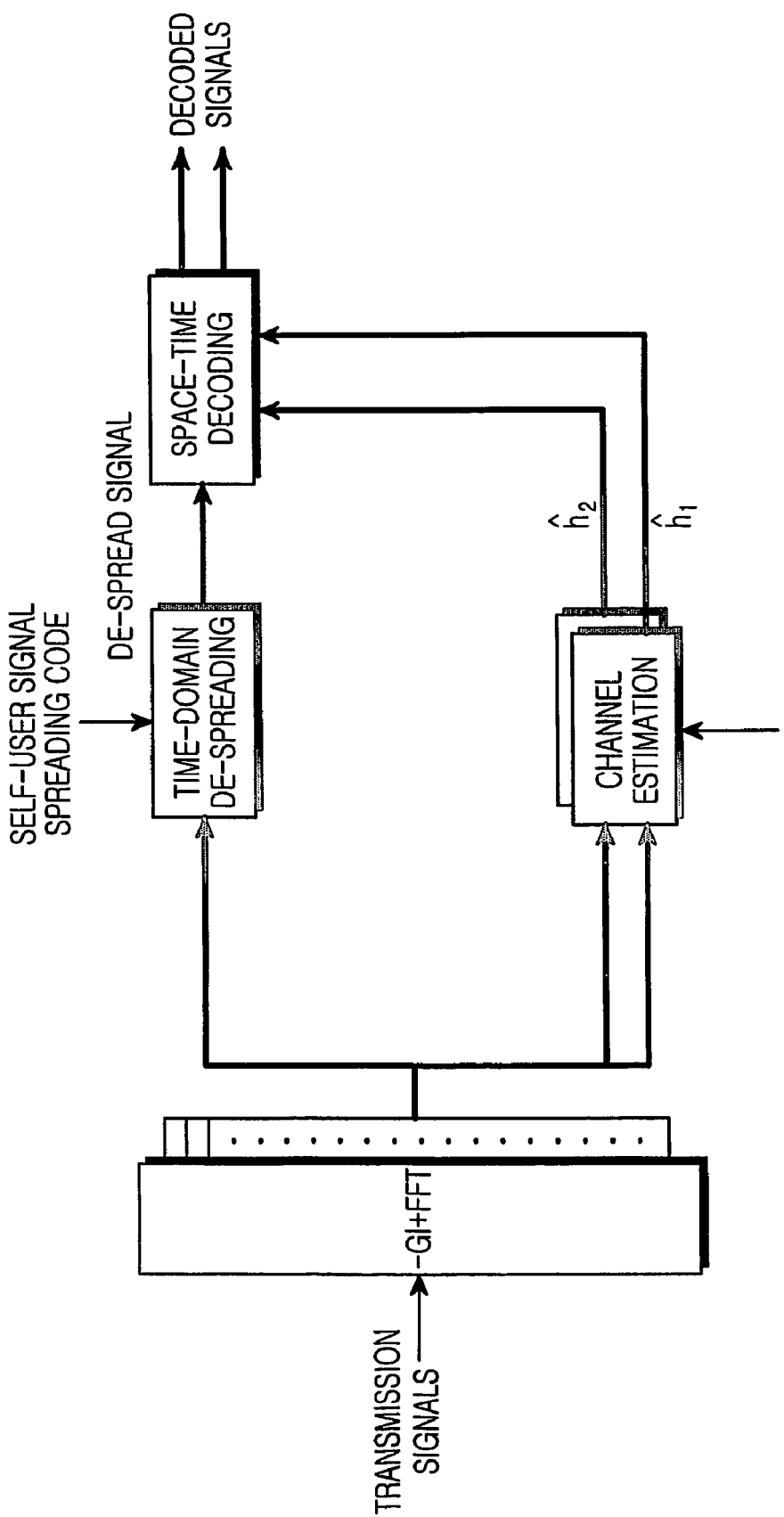
FIG. 11 is a block diagram illustrating the configuration of a conventional wireless receiver.
Figure 12:
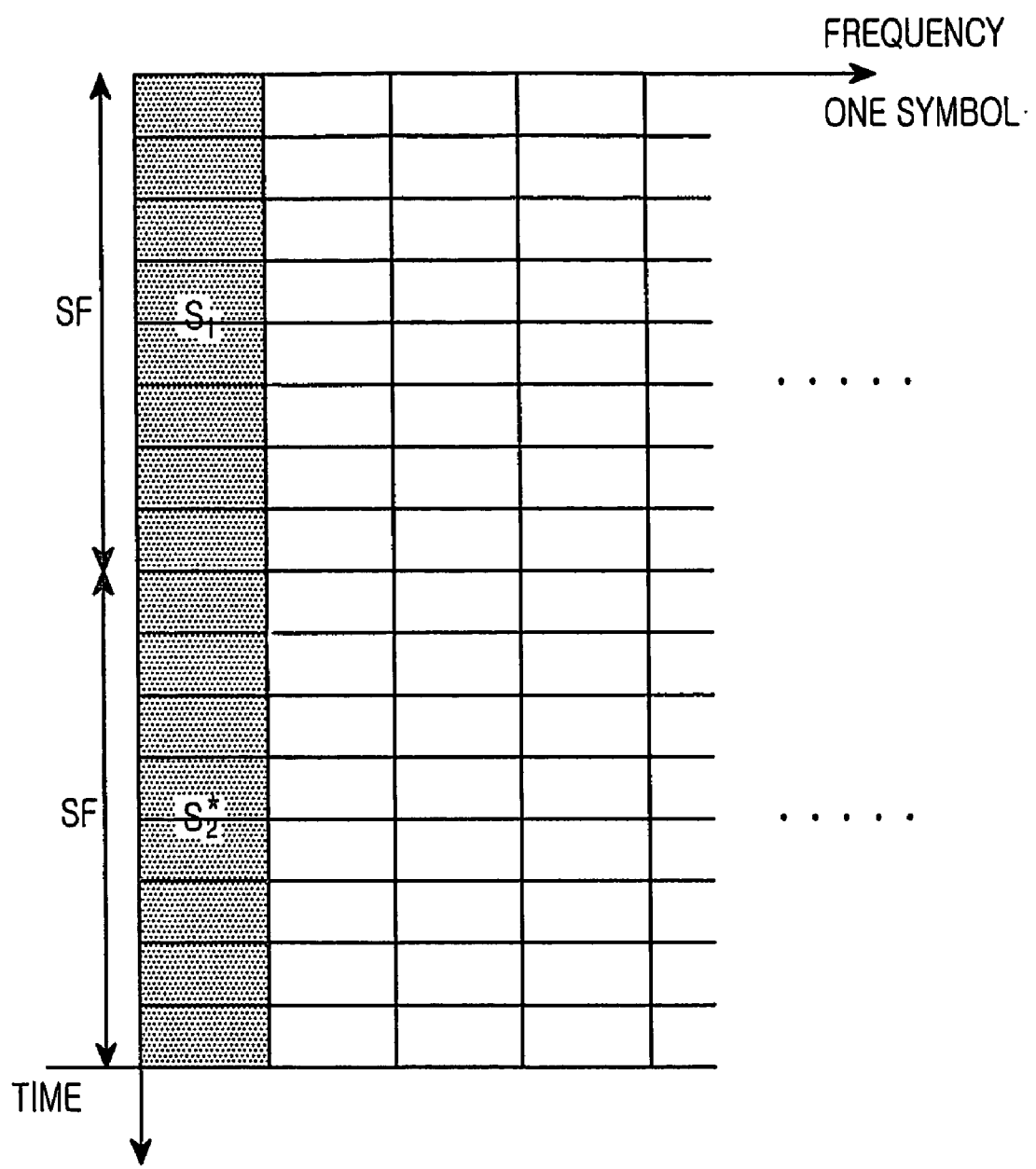
FIG. 12 is an explanatory view illustrating a principle for assigning a spreading region to a conventional space-time encoding output.

FIG. 9 is a block diagram illustrating a configuration of the wireless receiver in multi-carrier code-division multiplexing (MC-CDM) or orthogonal frequency-division multiplexingcode-division multiplexing (OFDM-CDM) where the wireless transmitter carries out a two-dimensional spreading operation in time and frequency domains in accordance with the preferred embodiment of the present invention.

The wireless receiver shown in FIG. 9 in accordance with the preferred embodiment of the present invention includes antenna branches 26-1 and 26-2, adders 25-1, 25-2, ... and 25-n, a block parallel-to-serial (P/S) converter 27, a de-interleaver 23, a decoder 21 and frequency-domain combiners 28-1, 28-2, ..., 28-2n-1 and 28-2n.

The antenna branch 26-1 includes an antenna 36, a fast Fourier transform (FFT) processor (=−GI+FFT) 35, de-spreaders 31-1, 31-2, ..., 31-2n-1 and 31-2n, de-spreaders 37-1, 37-2, ..., 37-2n-1 and 37-2n, channel estimators 38-1, 38-2, ..., 38-2n-1 and 38-2n, and space-time decoders 24-1, 24-2, ..., and 24-n.

Furthermore, the antenna branch 6-2 is constituted similarly to the antenna branch 6-1.

The antenna 36 receives a signal transmitted from the antenna branch 6-1 or 6-2 of the wireless transmitter, down-converts the received signal, and outputs the down-converted signal to the FFT processor 35.

The FFT processor 35 receives the signal from the antenna 36, removes a guard interval (GI) from the received signal, converts the signal from which the GI is removed into subcarrier signals, and outputs the subcarrier signals to the de-spreaders 31-1, 31-2, ..., 31-2n-1 and 31-2n, and the de-spreaders 37-1, 37-2, ..., 37-2n-1 and 37-2n.

The de-spreaders 37-1, 37-2, ..., 37-2n-1 and 37-2n receive the subcarrier signals, de-spread the received subcarrier signals in respective subcarriers using the spreading codes for the pilot signals used in the antenna branch 6-1 and 6-2 of the wireless transmitter, and output the de-spread signals to the channel estimators 38-1, 38-2, ..., 38-2n-1 and 38-2n.

The channel estimators 38-1, 38-2, ..., 38-2n-1 and 38-2n remove modulation phase components of the pilot signals associated with the de-spread signals, estimate channel responses in the antenna branches 6-1 and 6-2 of the wireless transmitter, and output the estimated channel responses to the space-time decoders 24-1, 24-2, ..., and 24-n.

The de-spreaders 31-1, 31-2, ..., 31-2n-1 and 31-2n receive the subcarrier signals, and generate replicas of the pilot signals in each transmit antenna using the pilot signals, the spreading codes for the pilot signals and the channel estimation values as shown in FIG. 5. Furthermore, the de-spreaders 31-1, 31-2, ..., 31-2n-1 and 31-2n subtract the pilot signals from the subcarrier signals by the generated replicas of the pilot signals, and de-spread a result of the subtraction in the time domain using spreading codes assigned to self-users.

After the subcarrier signals are de-spread using two pairs of spreading codes for a self-user in relation to a signal de-spread by the de-spreader 31-1 in the time domain, the space-time decoder 24-1 carries out a space-time decoding operation using channel estimation values.

Where receive antenna diversity is used, the adders 25-1 and 25-2 receives output signals of the space-time decoders 24-1 of the antenna branches 26-1 and 26-2, add space-time decoding outputs of the diversity branches, and output a result of the addition to the block P/S converter 27 or the frequency-domain combiners 28-1 and 28-2, respectively. That is, the adders 25-1, 25-2, ..., and 25-n output a result of the addition to the frequency-domain combiners 28-1, 28-2, ..., 28-2n-1 and 28-2n, respectively.

Where the two-dimensional spreading operation is used, the frequency-domain combiners 28-1, 28-2, ..., 28-2n-1 and 28-2n combine the space-time decoding outputs added by the adders 25-1, 25-2, ..., 25-n in the frequency domain, and output a result of the combining to the block P/S converter 27, respectively.

The block P/S converter 27 carries out a block P/S conversion operation for output signals of the adders 25-1, 25-2, ..., and 25-n or the frequency-domain combiners 28-1, 28-2, ..., 28-2n-1 and 28-2n, and outputs a result of the block P/S conversion operation to the de-interleaver 23.

The de-interleaver 23 receives an output signal of the block P/S converter 27, de-interleaves (re-orders) data of the received signal, the inverse operation of the interleaver 3, and outputs the de-interleaved data to the decoder 21.

The decoder 21 carries out an error correction operation for an output signal of the de-interleaver 23, and obtains decoded data.

Next, the operations of the wireless transmitter and receiver in accordance with the preferred embodiment of the present invention will be described with reference to the annexed drawings. Where the wireless transmitter in accordance with the preferred embodiment of the present invention sends transmission data Ω, the encoder 1, the mapper 2 and the interleaver 3 carry out an error correction encoding operation, a mapping operation to a modulation constellation and an interleaving operation, respectively. A result of the above-described operations is outputted to the space-time encoder 4.

As shown in FIG. 2, the space-time encoder 4 outputs a code stream $[S_1, -S_2]$ to the S/P converter 5-1, and outputs a code stream $[S_2, S_1^*]$ to the S/P converter 5-2.

The S/P converter 5-1 outputs a code signal $S_1$ to the S/P converter 10-1 of the antenna branch 6-1, and outputs a code signal $-S_2^*$ to the S/P converter 10-2.

Furthermore, the S/P converter 5-2 outputs a code signal $S_2$ to the S/P converter 10-1 of the antenna branch 6-2, and outputs a code signal $S_1^*$ to the S/P converter 10-2.

Next, the S/P converter 10-1 in the antenna branch 6-1 outputs the code signal $S_1$ to the spreader 11-1, and the S/P converter 102 outputs the code signal $-S_2^*$ to the spreader 11-2.

The spreader 11-1 spreads the code signal $S_1$ by means of the spreading code C1 and the spreader 11-2 spreads the code signal $-S_2^*$ by means of the spreading code C2.

The self-user signal multiplexer 12-1 carries out a code multiplexing operation for a spreading output of the code signal $S_1$ and a spreading output of the code signal $-S_2^*$ in the same spreading segment as shown in FIG. 4.

Similarly, the S/P converter 10-1 in the antenna branch 6-2 outputs the code signal $S_2$ to the spreader 11-1, and the S/P converter 102 outputs the code signal $S_1^*$ to the spreader 11-2.

The spreader 11-1 spreads the code signal $S_2$ by means of the spreading code C1 and the spreader 11-2 spreads the code signal $S_1^*$ by means of the spreading code C2.

The self-user signal multiplexer 12-1 carries out a code multiplexing operation for a spreading output of the code signal $S_2$ and a spreading output of the code signal $S_1^*$ in the same spreading segment as shown in FIG. 4.

The spreaders 11-1 and 11-2 carry out time-domain spreading or two-dimensional spreading in time and frequency domains as shown in FIG. 3, respectively. For example, where the time-domain spreading operation for the space-time code signal $S_1$ is carried out, the space-time code signal $S_1$ is spread by a plurality of symbols in one subcarrier. Alternatively, where the space-time spreading operation is carried out in the time and frequency domains, the space-time code signal $S_1$ is spread by a plurality of symbols in a plurality of subcarriers.

Thus, the self-user signal multiplexer 12-1 can obtain code-multiplexed self-user signals. Subsequently, the other-user signal multiplexer 13 multiplexes the self-user signals, space-time coded, spread and multiplexed from the self-user signal multiplexers 12-1 with other user signals from the self-user signal multiplexers 12-2 and others.

Subsequently, the pilot signal multiplexer 14 spreads pilot signals sp by spreading codes therefor orthogonal to the spreading codes C1 and C2 in respective subcarriers within a time-domain spreading region or two-dimensional spreading region. The pilot signal multiplexer 14 multiplexes the spread pilot signals and the multiplexed other-user and self-user signals.

The IFFT processors 15 transform frame signals (FIG. 4) generated by the above-described operations into time domain signals by IFFT. The IFFT processors 15 then add guard intervals (GIs) to the frame signals, up-convert the frame signals to which the GIs are added into carrier frequencies, and simultaneously transmit the up-converted frame signals to two antennas 16 coupled to the antenna branches 6-1 and 6-2.

On the other hand, the antennas 36 coupled to the antenna branches 26-1 and 26-2 in the wireless receiver receive signals radiated from the antennas of the antenna branches 26-1 and 26-2.

The FFT processor 35 receives the signal from the antenna 36, removes a GI from the received signal, converts the signal from which the GI is removed into a subcarrier signal, and outputs the subcarrier signal to the de-spreaders 31-1 and 31-2 and the de-spreaders 37-1 and 37-2.

As the FFT processors 35 remove GIs and carry out conversion operations to subcarrier signals according to FFT, the de-spreaders 37-1 receive the subcarrier signals converted at the $1^{st}$ and $2^{nd}$ time slots and carry out de-spreading operations in respective subcarriers using the spreading code #1 for a pilot signal, such that each de-spreader 37-1 outputs a product of a channel h1 and a pilot signal sp. Similarly, the de-spreaders 37-2 carry out de-spreading operations in respective subcarriers using the spreading code #2 for a pilot signal, such that each de-spreader 37-2 outputs a product of a channel h2 and a pilot signal sp.

Next, the channel estimators 38-1 and 38-2 remove modulation components of the pilot signals from signals corresponding to the product of the channel h1 and the pilot signal sp and the product of the channel h2 and the pilot signal sp, and estimate channel response values h1 and h2.

Then, the channel estimators 38-1 and 38-2 generate replicas of the pilot signals received from respective transmit antennas using the pilot signals sp, the spreading codes #1 and #2 for the pilot signals and the channel estimation values h1 and h2.

On the other hand, the de-spreaders 31-1 and 31-2 subtract the received pilot signal replicas generated by the channel estimators 38-1 and 38-2 from the received subcarrier signals based on a Fourier transform operation. The received subcarrier signals from which the pilot signals are subtracted are de-spread in the time domain using the spreading codes C1 and C2 assigned to a self-user by the de-spreaders 31-1 and 31-2.

A signal de-spread by the spreading code C1 is expressed as a sum of a product of the channel h1 and the code signal $S_1$ and a product of the channel h2 and the code signal $S_2$. Moreover, a signal de-spread by the spreading code C2 is expressed as a sum of a product of the channel h1 and the code signal $-S_2^*$ and a product of the channel h2 and the code signal $S_1$.

Furthermore, the space-time decoder 24-1 produces the code signal $S_1$ and the code signal $S_2$ from two de-spreading outputs at the different time slots using the channel estimation values h1 and h2.

Where the transmission signals are spread in the time domain, the wireless receiver decodes the received signals (refer to FIG. 5).

On the other hand, where two-dimensional spreading for the transmission signals is spread in the time and frequency domains, a space-time code signal decoded in each subcarrier is combined in the frequency domain, such that the wireless receiver decodes the received signals (refer to FIG. 6).

In the conventional space-time transmit diversity, time-domain outputs of the space-time code matrix are spread in a plurality of spreading regions. However, in the space-time transmit diversity in accordance with the present invention, time-domain outputs of the space-time code matrix are spread in one spreading region using a plurality of spreading codes, such that the robustness against the time variation associated with a channel can be improved. Furthermore, where the two-dimensional spreading is used, a partial de-spreading operation in the time domain in each subcarrier is carried out, a decoding operation is carried out, and a result of the decoding operation can be combined in the frequency domain.

The configuration of a frame in which pilot signals are code-multiplexed has been described in the above-described embodiment. The present invention is not limited to the frame configuration in the above-described embodiment. For example, the configuration of a frame in which pilot signals are time-multiplexed can be applied to the present invention.

Where spreading codes remain, they are used for a high-speed mobile user and space-time encoding outputs can be multiplexed in one spreading segment.

Moreover, where two high-speed mobile users are present, the two users can use two time slots divided for space-time transmit diversity, and can use all spreading codes assigned thereto.

The wireless transmitter and receiver internally include a computer system. A set of processes associated with the signal processing is stored in a computer-readable recording medium in the form of a program. A computer reads and executes the program to perform the signal processing. Here, the computer-readable recording medium includes compact disc-read only memories (CD-ROMs), digital versatile disc-read only memories (DVD-ROMs), semiconductor memories, etc. Moreover, the computer program is distributed to a computer through a communication line, such that the computer can execute the distributed computer program.

INDUSTRIAL APPLICABILITY

As apparent from the above description, the present invention allows a wireless transmitter to encode transmission signals using a space-time code matrix, to spread space-time code signals of time slots at which space-time encoding outputs are different using different spreading codes, and to transmit the spread signals, and allows a wireless receiver to receive the spread signals, to de-spread the received spread signals at predetermined time slots using spreading codes corresponding thereto, to decode the de-spread signals using the space-time code matrix, thereby improving the robustness against Doppler frequency by containing transmit diversity signals in one spreading region.

The invention claimed is:

1. A wireless transmitter, comprising:
an encoder to encode transmitting signals using a space-time code matrix and to output space-time code outputs, each of the space-time code outputs including space-time code signals;
spreaders to respectively spread space-time code signals of each of the space-time code outputs by using a plurality of different spreading codes, the space-time code signals being different based on an encoding operation of the encoder, wherein the space-time code signals of each of the space-time code outputs are spread into a same spreading region in time and frequency domains in order that the spread space-time code signals are stacked on the same spreading region;
multiplexers to respectively generate a multiplexed spread space-time code signal by multiplexing the spread space-time code signals of the same spreading region; and
a transmitter to simultaneously transmit multiplexed spread space-time code signals output from the multiplexers through different antennas;
wherein the space-time code signals include a first space-time code signal and a second space-time code signal, the first and second space-time code signals correspond to first and second time slots, respectively, and each of the spreaders spreads the first and second space-time code signals into the same spreading region using the spreading codes at the first and second time slots.

2. The wireless transmitter as set forth in claim 1, wherein each of the spreaders spreads the space-time code signals of the time slots at which the space-time encoding outputs are different, in a time domain using the different spreading codes.

3. The wireless transmitter as set forth in claim 1, wherein each of the spreaders spreads the space-time code signals of the time slots at which the space-time encoding outputs are different, in time and frequency domains using the different spreading codes.

4. A wireless receiver, comprising:
a receiver to receive simultaneously multiplexed spread space-time code signals that have been spread into different spreading regions, wherein each of the multiplexed spread space-time code signals is generated by multiplexing spread space-time signals of a same spreading region, the spread space-time code signals are spread using different spreading codes and are spread into the same spreading region in order that the spread space-time code signals are stacked on the same spreading region;
a de-spreader to de-spread the spread space-time code signals received by the receiver at predetermined time slots using the spreading codes corresponding thereto; and
a decoder to decode the de-spread space-time code signals from the de-spreader using the space-time code matrix;
wherein the space-time code signals include a first space-time code signal and a second space-time code signal, the first and second space-time code signals correspond to first and second time slots, respectively, and the de-spreader de-spreads the first and second space-time code signals of the same spreading region using one of the spreading codes at the first and second time slots.

5. A wireless receiver, comprising:
receiving means for simultaneously receiving multiplexed spread space-time code signals that have been spread into different spreading regions in a time domain, wherein each of the multiplexed spread space-time code signals is generated by multiplexing spread space-time code signals of a same spreading region, the spread space-time code signals are spread using different spreading codes and are spread into the same spreading region in order that the spread space-time code signals are stacked on the same spreading region;
de-spreading means for de-spreading the spread space-time code signals received by the receiving means at predetermined time slots in the time domain using the spreading codes corresponding thereto; and
decoding means for decoding the de-spread space-time code signals from the de-spreading means using the space-time code matrix;
wherein the space-time code signals include a first space-time code signal and a second space-time code signal, the first and second space-time code signals correspond to first and second time slots, respectively, and each of the de-spreading means de-spreads the first and second space-time code signals of the same spreading region using the spreading codes at the first and second time slots.

6. A wireless receiver, comprising:
receiving means for simultaneously receiving multiplexed spread space-time code signals that have been spread into different spreading regions in time and frequency domains, wherein each of the multiplexed spread space-time code signals is generated by multiplexing spread space-time code signals of a same spreading region, the spread space-time code signals are spread using different spreading codes and are spread into the same spreading region in order that the spread space-time code signals are stacked on the same spreading region;
de-spreading means for de-spreading the spread space-time code signals received by the receiving means at predetermined time slots in the time domain using the spreading codes corresponding thereto;
decoding means for decoding the de-spread space-time code signals from the de-spreading means using the space-time code matrix; and
combining means for combining the decoded signals from the decoding means in the frequency domain;
wherein the space-time code signals include a first space-time code signal and a second space-time code signal, the first and second space-time code signals correspond to first and second time slots, respectively, and the first and second space-time code signals of the same spreading region are de-spread using the spreading codes at the first and second time slots.

7. A transmitting method, comprising:
encoding transmission signals using a space-time code matrix and outputting space-time code outputs, each of the space-time code outputs including space-time code signals;
spreading space time code signals of each of the space-time code outputs by using a plurality of different spreading codes, the space-time code signals being different based on an encoding operation of the encoder, wherein the space-time code signals of each of the space-time code outputs are spread into a same spreading region in time and frequency domains in order that the spread space-time code signals are stacked on the same spreading region;
multiplexing the spread space-time code signals of the same spreading region to generate multiplexed spread space-time code signals corresponding to the space-time code outputs; and simultaneously transmitting the multiplexed spread space-time code signals through different antennas;

wherein the space-time code signals include a first space-time code signal and a second space-time code signal, the first and second space-time code signals correspond to first and second time slots, respectively, and the first and second space-time code signals are spread into the same spreading region using the spreading codes at the first and second time slots.

8. A receiving method, comprising:

simultaneously receiving multiplexed spread space-time code signals that have been spread into spreading regions, wherein each of the multiplexed spread space-time code signals is generated by multiplexing spread space-time code signals of a same spreading region, the spread space-time code signals are spread using different spreading codes and are spread into the same spreading region in order that the spread space-time code signals are stacked on the same spreading region;

de-spreading the received spread space-time code signals at predetermined time slots using the spreading codes corresponding thereto; and decoding the de-spread space-time code signals using the space-time code matrix;

wherein the space-time code signals include a first space-time code signal and a second space-time code signal, the first and second space-time code signals correspond to first and second time slots, respectively, and the first and second space-time code signals of the same region are de-spread using the spreading codes at the first and second time slots.

9. A non-transitory computer readable medium encoding a transmitter program, when executed by a computer, to perform processes comprising:

encoding transmission signals using a space-time code matrix and outputting space-time code outputs, each of the space-time code outputs including space-time code signals;

spreading space-time code signals of each of the space-time code outputs by using a plurality of different spreading codes, the space-time code signals being different based on an encoding operation of the encoder, wherein the space-time code signals of each of the space-time code outputs are spread into a same spreading region in time and frequency domains in order that the spread space-time code signals are stacked on the same spreading region;

multiplexing the spread space-time code signals of the same spreading region to generate multiplexed spread space-time code signals corresponding to the space-time code outputs; and simultaneously transmitting the multiplexed spread space-time code signals through different antennas;

wherein the space-time code signals include a first space-time code signal and a second space-time code signal, the first and second space-time code signals correspond to first and second time slots, respectively, and the first and second space-time code signals are spread into the same spreading region using the spreading codes at the first and second time slots.

10. A non-transitory computer readable medium encoding a receiver program, when executed by a computer, to perform processes comprising:

simultaneously receiving multiplexed spread space-time code signals that have been spread into different spreading regions, wherein each of the multiplexed spread space-time code signals is generated by multiplexing spread space-time code signals of a same spreading region, the spread space-time code signals are spread using different spreading codes and are spread into the same spreading region in order that the spread space-time code signals are stacked on the same spreading region;

de-spreading the received spread space-time code signals at predetermined time slots using the spreading codes corresponding thereto; and decoding the de-spread space-time code signals using the space-time code matrix; and wherein the space-time code signals include a first space-time code signal and a second space-time code signal, the first and second space-time code signals correspond to first and second time slots, respectively, and the first and second space-time code signals of the same region are de-spread using the spreading codes at the first and second time slots.

* * * * *